E. KLAHN.
BALL BEARING ROLLER.
APPLICATION FILED APR. 15, 1913.

1,218,275.

Patented Mar. 6, 1917.

Witnesses:
John E. Prager
A. Worden Gibbs

Inventor
Emil Klahn
By his Attorney

UNITED STATES PATENT OFFICE.

EMIL KLAHN, OF WEEHAWKEN, NEW JERSEY.

BALL-BEARING ROLLER.

1,218,275. Specification of Letters Patent. Patented Mar. 6, 1917.

Application filed April 15, 1913. Serial No. 761,150.

*To all whom it may concern:*

Be it known that I, EMIL KLAHN, a citizen of the United States, and a resident of Weehawken, in the county of Hudson and State of New Jersey, have invented certain new and useful Improvements in Ball-Bearing Rollers, of which the following is a specification.

The invention relates to wheels, more particularly to ball bearing wheels such as are employed in connection with roller skates; and, also, to a novel ball retainer or separator for use in conjunction therewith.

The invention has for its object to provide a self-containing ball bearing wheel and which wheel may be cheaply and simply stamped out of sheet metal and present a neat and finished appearance.

In the accompanying drawings, which illustrate the invention—

Similar characters of reference designate corresponding parts throughout the several views.

Figure 1:
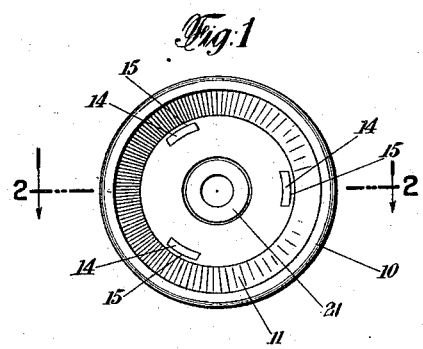
Figure 1 is a plan of the improved wheel.
Figure 2:
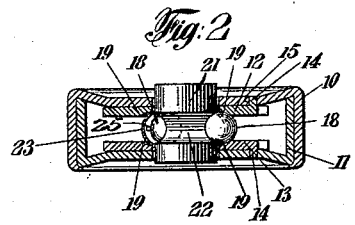
Fig. 2 is a vertical section taken on the line 2—2, Fig. 1.
Figure 5:
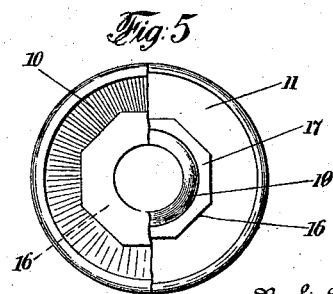
Fig. 5 is a plan of a modified form of the wheel, a half of the upper portion being broken away and the separator member or ball retainer omitted.

Referring to the drawings, 10 designates a circular cupped member drawn in well-known manner from suitable sheet metal and preferably centrally concaved at its outer face, as shown. 11 designates a similar cupped member but of smaller diameter and adapted to be fitted within the member 10, thus providing a wheel member whose rim is reinforced by the inner cupped member 11. These two cupped members are centrally perforated and fit tightly the one within the other, the rim of the member 10 being turned slightly over the bottom or outer face of the member 11 to insure against their separation. Upon the inner face of each of these members, within the wheel, are located centrally perforated plates 12 and 13 respectively, shown in Fig. 2 as circular and each provided with a plurality of depending lips or projections 14 which fit corresponding slots 15 in the faces of the members 10 and 11. The projections 14 are preferably formed by making cuts inwardly from the circumference of the plates, in pairs, and bending over the lips thus formed, the overhanging portions of the plates thus strengthening the wheel against lateral stresses. Or, as in Fig. 5, the faces may be depressed or sunk, the depressed or sunken portions 16 being of polygonal contour and adapted to receive similarly shaped plates 17. In either construction, the plates are secured against angular displacement and are adapted to retain between them a set of balls 18 fitting raceways 19 of the plates.

Figure 3:
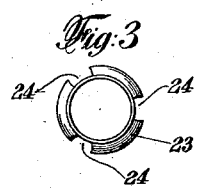
Fig. 3 is a plan of the improved retainer employed.
Figure 4:
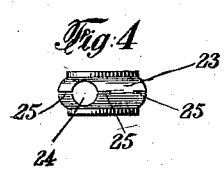
Fig. 4 is an elevation thereof.

The said balls are confined by a suitable retainer or separator, Figs. 3 and 4, which retainer in turn is fitted about a centrally disposed sleeve 21 adapted to slip over a suitable axle or the like (not shown), said sleeve having a peripheral raceway or groove 22 for the said balls. The retainer or separator itself consists of an annular, rounded shell 23 of resilient metal and having suitably spaced perforations 24 of such a shape that the balls may be snapped therethrough and confined between the shell and the raceway of the sleeve 21. Slots 25 may be provided in the shell for this purpose and extend into said perforations; the balls projecting beyond the separator at its circumference and sides. At each end the shell 23 is provided with a short sleeve portion which extends into the central openings of the respective plates 12 and 13 to rotate freely therein.

I claim:

1. A wheel comprising two cupped members, the one fitting within the other, and each provided with a centrally disposed opening, said members having a substantially flat central portion; a sleeve passing through said opening and provided with a peripheral groove; two substantially flat plates within said wheel and held to the respective flat portions of the cup members and against rotation relatively thereto, said plates affording a raceway with said peripheral groove; and a set of balls confined between said plates in said raceway.

2. A wheel comprising two cupped members, the one fitting within the other; a sleeve passing therethrough; a ball separator or retainer about said sleeve; a set of balls retained thereby upon said sleeve; and two plates within said wheel, providing a raceway for said balls and held in the respective cup members.

3. A wheel comprising two cupped members, the one fitting within the other and each provided with a centrally disposed opening, and with slots in their faces, said members having a substantially flat central portion; a sleeve passing through the said openings; two substantially flat plates within said wheel, held to the respective flat portions of the cup members and having bent over lips extending respectively through the said slots; and a set of balls confined between said plates and fitting about said sleeve.

4. A wheel comprising two centrally perforated cupped members, the one fitting within the other and the rim of one turned over the bottom of the other; a sleeve passing through said perforations and provided with a peripheral groove; a set of balls fitting said peripheral groove, and a ball separator or retainer about said sleeve to confine the balls; and two plates held by the respective cupped members upon their inner faces and each provided with a raceway for said balls.

5. A wheel comprising two centrally perforated cupped members, the one fitting within the other and the rim of one turned over the bottom of the other; a sleeve passing through said perforations and provided with a peripheral groove; of a ball separator or retainer comprising an annular rounded shell of resilient material fitted about said sleeve and provided with a plurality of perforations and having slots extending into the perforations, the balls being confined between the said peripheral groove and the said shell; and two plates held by the respective cupped members upon their inner faces and each provided with a raceway for said balls.

6. A wheel comprising two inclosing members, each provided with a centrally disposed opening; a sleeve passing through said openings; a ball separator or retainer about said sleeve; a set of balls retained thereby upon said sleeve; and means within said inclosing members, held against rotation relatively thereto and providing a raceway for said balls.

7. A skate roller consisting of a ground engaging portion having an inwardly extending web; two bearing rings of which one at least is provided with lugs holding it to said web to prevent its rotation relatively to said portion; an axle member; and antifriction elements operative between said member and the rings.

8. A skate roller including a body consisting of two members; an axle member concentric therewith; two bearing rings having lugs holding them to said members; and antifriction elements between said rings and the members.

9. A skate roller consisting of two cup-shaped members fitted together; two bearing rings having lugs rigidly holding them to said members so as to prevent their relative rotation; an axle member extending concentrically through said bearing rings; and antifriction elements mounted between said axle member and said rings.

Signed at New York, in the county of New York, and State of New York, this 14th day of April A. D. 1913.

EMIL KLAHN.

Witnesses:
FRED'K F. SCHUETZ,
SALLY O. YUDIZKY.

Copies of this patent may be obtained for five cents each, by addressing the "Commissioner of Patents, Washington, D. C."